US011306993B2

(12) United States Patent
Bushman

(10) Patent No.: US 11,306,993 B2
(45) Date of Patent: Apr. 19, 2022

(54) COMPOUND BOW PERFORMANCE MODULE

(71) Applicant: JCB Engineered Solutions LLC, Tomball, TX (US)

(72) Inventor: Jerod C. Bushman, Tomball, TX (US)

(73) Assignee: JCB ENGINEERED SOLUTIONS LLC, Tomball, TX (US)

( * ) Notice: Subject to any disclaimer, the term of this patent is extended or adjusted under 35 U.S.C. 154(b) by 0 days.

(21) Appl. No.: 16/848,465

(22) Filed: Apr. 14, 2020

(65) Prior Publication Data

US 2020/0333101 A1 Oct. 22, 2020

Related U.S. Application Data

(60) Provisional application No. 62/836,427, filed on Apr. 19, 2019.

(51) Int. Cl.
| | |
|---|---|
| F41B 5/14 | (2006.01) |
| F41B 5/10 | (2006.01) |
| G01P 1/02 | (2006.01) |
| G01P 3/36 | (2006.01) |
| G08B 21/18 | (2006.01) |
| G01B 7/16 | (2006.01) |
| G01L 5/04 | (2006.01) |
| F41G 1/467 | (2006.01) |
| G01P 3/50 | (2006.01) |

(52) U.S. Cl.
CPC .............. *F41B 5/1403* (2013.01); *F41B 5/10* (2013.01); *F41B 5/1492* (2013.01); *F41G 1/467* (2013.01); *G01B 7/16* (2013.01); *G01L 5/04* (2013.01); *G01P 1/023* (2013.01); *G01P 1/026* (2013.01); *G01P 3/36* (2013.01); *G01P 3/50* (2013.01); *G08B 21/182* (2013.01)

(58) Field of Classification Search
CPC .... F41B 5/10; F41B 5/123; F41B 5/14; F41B 5/1403; F41B 5/148; F41B 5/1492
USPC ...................................... 124/25, 25.6, 86, 88
See application file for complete search history.

(56) References Cited

U.S. PATENT DOCUMENTS

| | | | | |
|---|---|---|---|---|
| 6,029,120 A * | 2/2000 | Dilger | ....................... | F41B 5/14 |
| | | | | 124/86 |
| 6,191,574 B1 * | 2/2001 | Dilger | ....................... | F41B 5/14 |
| | | | | 124/87 |
| 6,898,971 B2 * | 5/2005 | Dilz, Jr. | ................. | A63B 71/06 |
| | | | | 73/488 |
| 7,086,298 B1 * | 8/2006 | Colman | .................. | F41A 31/00 |
| | | | | 73/862.51 |
| 7,318,429 B2 * | 1/2008 | Achkar | ..................... | F41B 5/14 |
| | | | | 124/86 |
| 7,337,773 B2 * | 3/2008 | Simo | ....................... | F41B 5/143 |
| | | | | 124/44.5 |

(Continued)

*Primary Examiner* — Alexander R Niconovich
(74) *Attorney, Agent, or Firm* — Ewing & Jones, PLLC

(57) ABSTRACT

A compound bow includes a riser, an upper limb, and a lower limb, the upper limb and lower limbs coupled to the riser. The compound bow may include a draw sensor. The compound bow includes a performance module coupled to the riser, the performance module operatively coupled to the draw sensor. A compound bow may include an arrow chronometer assembly. A method may include determining draw weight or length based on measurements of the draw sensor. A method may include determining arrow speed based on measurements of the arrow chronometer assembly.

23 Claims, 5 Drawing Sheets

(56) References Cited

U.S. PATENT DOCUMENTS

| | | | |
|---|---|---|---|
| 10,281,229 B2* | 5/2019 | Haynes | F41B 5/148 |
| 10,281,232 B2* | 5/2019 | Pell | A63B 23/03508 |
| 10,852,095 B2* | 12/2020 | Haynes | F41B 5/1434 |
| 2005/0123883 A1* | 6/2005 | Kennen | F41G 1/467 |
| | | | 434/11 |
| 2008/0287229 A1* | 11/2008 | Donahoe | F41B 5/14 |
| | | | 473/570 |
| 2013/0098344 A1* | 4/2013 | Morris, II | F41B 5/1469 |
| | | | 124/25.6 |
| 2017/0284762 A1* | 10/2017 | Thacker, Jr. | F41B 5/1434 |
| 2018/0058961 A1* | 3/2018 | Dunham | F41B 5/1469 |
| 2018/0172388 A1* | 6/2018 | Haynes | G01L 1/044 |
| 2019/0219355 A1* | 7/2019 | Haynes | F41B 5/148 |
| 2021/0071984 A1* | 3/2021 | Haynes | F41B 5/1434 |

* cited by examiner

COMPOUND BOW PERFORMANCE MODULE

CROSS-REFERENCE TO RELATED APPLICATIONS

This application is a non-provisional application which claims priority from U.S. provisional application No. 62/836,427, filed Apr. 19, 2019, which is incorporated by reference herein in its entirety.

TECHNICAL FIELD/FIELD OF THE DISCLOSURE

The present disclosure relates generally to archery and more specifically it relates to the monitoring of bow performance and various aspects of hunting/archery.

BACKGROUND OF THE DISCLOSURE

Archery, as a sport or for use in hunting, has existed for thousands of years. Over time, the technology associated with bows has improved, allowing for an increase in reliability and accuracy. As bows have become more complex, the importance of monitoring the performance of the bow and components thereof has increased. Certain components, such as the bowstring, must be replaced as they wear down. Improper maintenance of the bow components can be dangerous to a user or may cause unnecessary damage to the bow.

Modern archers also have the choice of many accessories to carry with them or to attach to their bow. Many of these accessories require independent power supplies and require each accessory to be activated individually. Adding such components to an existing bow may complicate the bow and may impair the operation of the bow, or at least require compromises in the use of the bow to accommodate the added accessories.

Additionally, the increased accuracy of modern bows has placed a higher burden on the user to improve technique to get the best performance available from their equipment. Coaching of an archer typically requires a coach or other third party to observe the archer while using the bow and to provide comments. In addition to requiring another person to observe the archer, feedback from such coaching may be subjective or limited to the ability of another to identify what an archer is doing incorrectly.

The determination of certain parameters of a bow, including, for example, arrow speed, draw weight, and draw length, may influence the selection of certain equipment including, for example, the type of arrow. The measurement of such parameters traditionally requires a third party with additional external equipment, which may necessitate the archer to travel to a dedicated archery shop or other location to have such measurements taken.

SUMMARY

The present disclosure provides for a compound bow. The compound bow may include a riser. The compound bow may include an upper limb, the upper limb coupled to the riser. The compound bow may include a lower limb, the lower limb coupled to the riser. The compound bow may include a draw sensor. The compound bow may include a performance module coupled to the riser, the performance module operatively coupled to the draw sensor.

The present disclosure also provides for a compound bow. The compound bow may include a riser. The riser may include an arrow rest. The compound bow may include an arrow chronometer assembly. The arrow chronometer assembly may be mechanically coupled to the riser at or near the arrow rest. The arrow chronometer assembly may include one or more sensors positioned to detect movement of an arrow through arrow chronometer assembly.

The present disclosure also provides for a method. The method may include providing a compound bow. The compound bow may include a riser. The compound bow may include an upper limb, the upper limb coupled to the riser. The compound bow may include a lower limb, the lower limb coupled to the riser. The compound bow may include a bowstring coupled between the upper limb and the lower limb. The compound bow may include a draw sensor. The compound bow may include a performance module coupled to the riser. The performance module may be operatively coupled to the draw sensor. The method may include placing an arrow onto the compound bow. The method may include drawing back the bowstring. The method may include measuring, with the draw sensor, at least one parameter indicative of a draw weight or draw length. The method may include determining the draw weight or draw length with the performance module.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
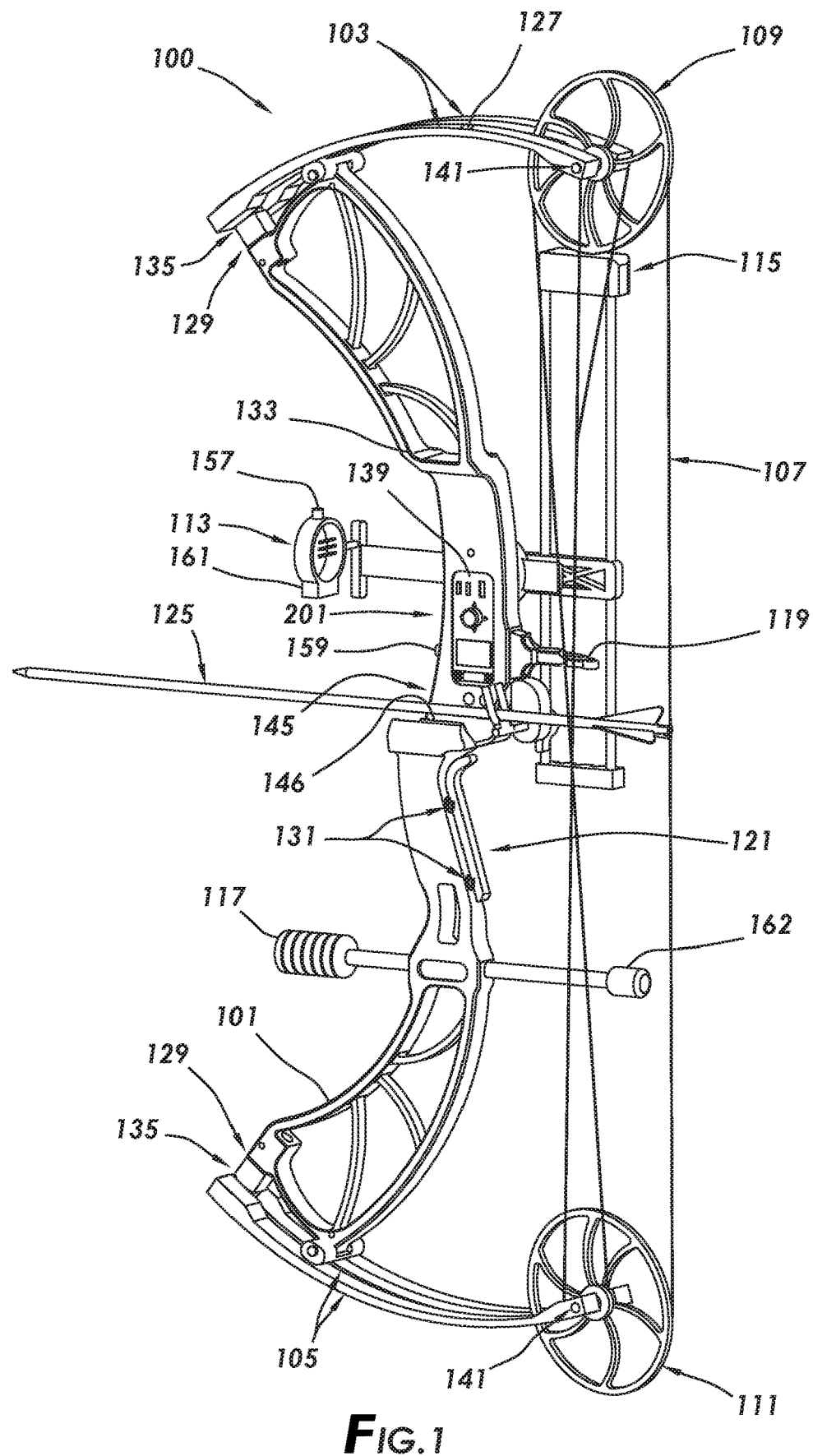
FIG. 1 is a perspective view of a compound bow including a performance module consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts compound bow 100. Compound bow 100 may include riser 101. Riser 101 may be a rigid body and may be formed, for example and without limitation, from aluminum, magnesium alloy, or carbon fiber. Compound bow 100 may include upper limb 103 and lower limb 105 coupled to riser 101. Upper limb 103 and lower limb 105 may be formed from a flexible material designed to deflect as bowstring 107 is drawn back by a user to store energy used to propel an arrow. Bowstring 107 may be coupled to upper limb 103 and lower limb 105 through upper wheel 109 and lower wheel 111. In some embodiments, upper wheel 109 and lower wheel 111 may be cam-shaped such that the amount of force required to draw bowstring 107 reduces through the draw stroke. In some embodiments, bowstring 107 may extend around upper wheel 109 and lower wheel 111 and may couple to upper limb 103 and lower limb 105 at the ends of bowstring 107.

In some embodiments, compound bow 100 may include additional components including, for example and without limitation, bow sight 113, quiver 115, stabilizer 117, and spring stop 162 coupled to riser 101. In some embodiments, compound bow 100 may include cable guard 119 coupled to riser 101. Cable guard 119 may, for example and without limitation, guide bowstring 107 during a stroke. In some embodiments, compound bow 100 may include grip 121 coupled to riser 101. Grip 121 may provide an interface between compound bow 100 and a hand of a user. In some embodiments, compound bow 100 may include arrow rest 123 positioned to, for example and without limitation, provide support for arrow 125 during preparation for and during a shooting stroke of compound bow 100.

In some embodiments, compound bow 100 may include performance module 201 as further discussed below. In some embodiments, compound bow 100 may include one or more sensors or transducers positioned to measure certain aspects of the operation of compound bow 100. For example, in some embodiments, compound bow 100 may include one or more sensors or transducers positioned to measure the draw weight of compound bow 100, defined as the amount of force necessary to pull bowstring 107 backward during a stroke. For example and without limitation, such sensors may include one or more of limb strain gauges 127 positioned to measure the strain on one or both of upper limb 103 and lower limb 105, limb-riser gap distance sensor 129 positioned between one or both of upper limb 103 and lower limb 105 and riser 101 to measure the length of the gap therebetween, grip strain gauges 131 positioned between grip 121 and riser 101 to measure the force on riser 101 imparted by the hand of a user, and riser strain gauges 133 positioned to measure the strain on riser 101. In some embodiments in which a strain gauge is used to measure draw weight, the measured strain may be used with a measured or predetermined spring coefficient for compound bow 100 to determine draw weight. In some embodiments, pressure or force sensor 135 may be positioned to measure pressure on limb adjustment bolt 137. In some embodiments, compound bow 100 may include one or more sensors positioned in spring stop 162 positioned to, for example and without limitation, determine the speed of bowstring 107 during a shot. Although depicted and described as strain gauges, in some embodiments, a force or pressure sensor other than a strain gauge may be used for one or more of the above-discussed sensors or transducers.

In some embodiments, compound bow 100 may include one or more sensors positioned to measure the movement of one or more components of compound bow 100. For example, in some embodiments, compound bow 100 may include sensor package 139, which may include one or more sensors for determining movement of compound bow 100 including, for example and without limitation, one or more single or multi-axis accelerometers and gyroscopes. Sensor package 139 may be used, for example and without limitation, to measure the stability of compound bow during a shot including one or more measurements of pitch and yaw of compound bow 100. In some embodiments, sensor package 139 may be used to measure vibration of compound bow 100 during a shot. In some embodiments, sensor package 139 may be used to determine the balance of compound bow 100. In some embodiments, sensor package 139 may be integrated into performance module 201 as discussed below.

In some embodiments, compound bow 100 may include one or more rotary sensors 141 positioned on one or both of upper wheel 109 and lower wheel 111. Rotary sensors 141 may, in some embodiments, measure the amount of rotation of upper wheel 109 and/or lower wheel 111 to determine the position of bowstring 107. In some embodiments, rotary sensors 141 may be used to determine the draw length of compound bow 100, defined as the distance between the position of bowstring 107 at rest and bowstring 107 when fully drawn back during a shooting action. In some embodiments, rotary sensors 141 may be used to measure the speed at which upper wheel 109 and/or lower wheel 111 rotates during a shot.

In some embodiments, compound bow 100 may include one or more sensors for directly determining the speed at which arrow 125 leaves compound bow 100 during a shot. In some embodiments, compound bow 100 may include arrow chronometer assembly 145 positioned at or about arrow rest 123. In some embodiments, arrow chronometer assembly 145 may include one or more sensors 146 positioned to detect the movement of arrow 125 through arrow chronometer assembly 145 to determine the speed at which arrow 125 leaves compound bow 100, referred to herein as arrow speed. Sensors 146 may include, for example and without limitation, one or more of magnetic sensors, ultrasonic sensors, or optical sensors. In some embodiments, arrow chronometer assembly 145 may detect the movement of a marker or markers positioned on arrow 125 to determine the speed of arrow 125. In some embodiments, the marker or markers positioned on arrow 125 may include one or more magnets. In such an embodiment, sensors 146 of arrow chronometer assembly 145 may include one or more electromagnetic sensors such as, for example and without limitation, Hall effect sensors or magnetometers, positioned to determine the passage of the one or more magnetic markers to determine arrow speed. In some embodiments, sensors 146 of arrow chronometer assembly 145 may include one or more distance sensors such as ultrasonic distance sensors used to monitor the movement of arrow 125 over time to determine arrow speed.

Figure 2:
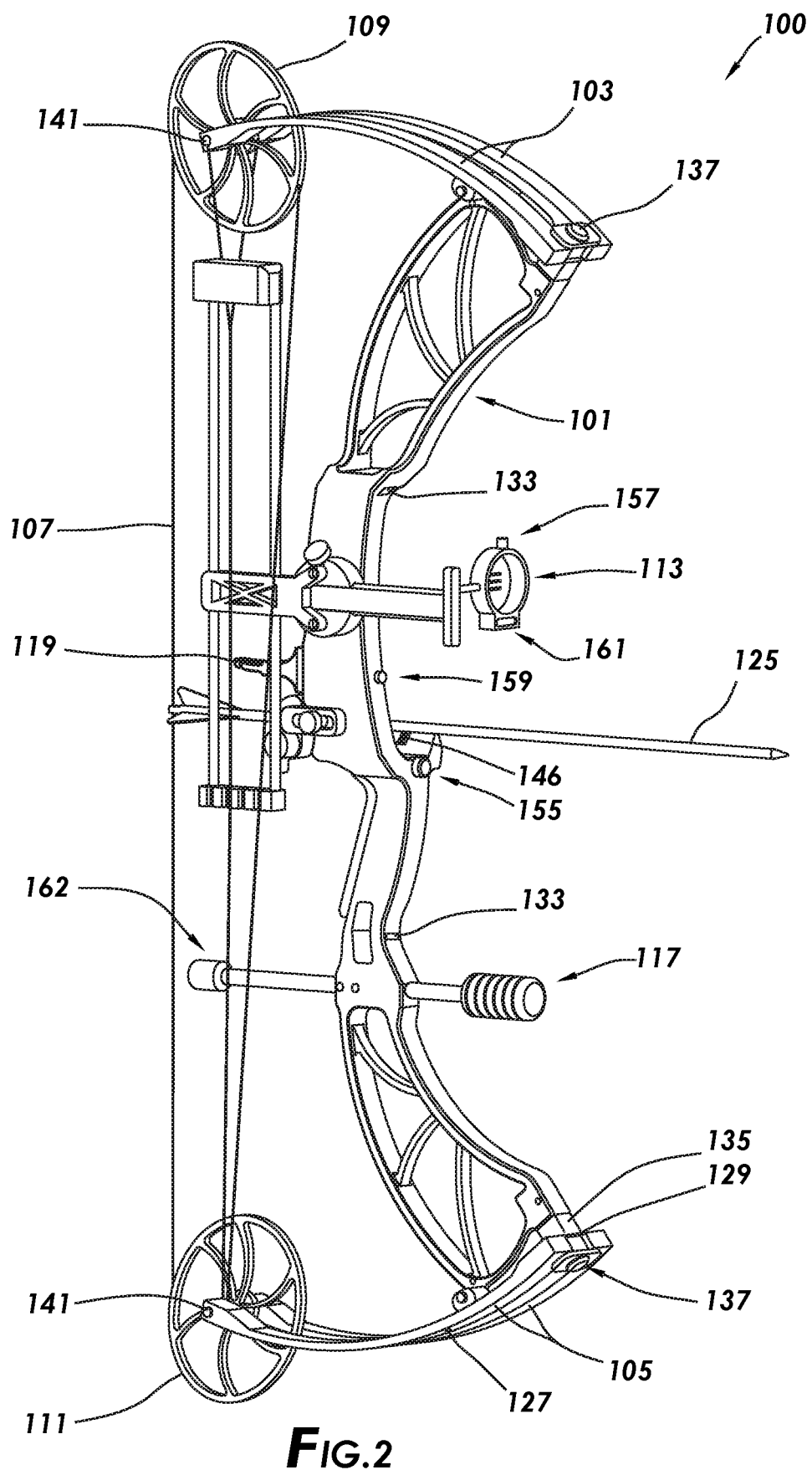
FIG. 2 is an alternative perspective view of the compound bow of FIG. 1.
Figure 2A:
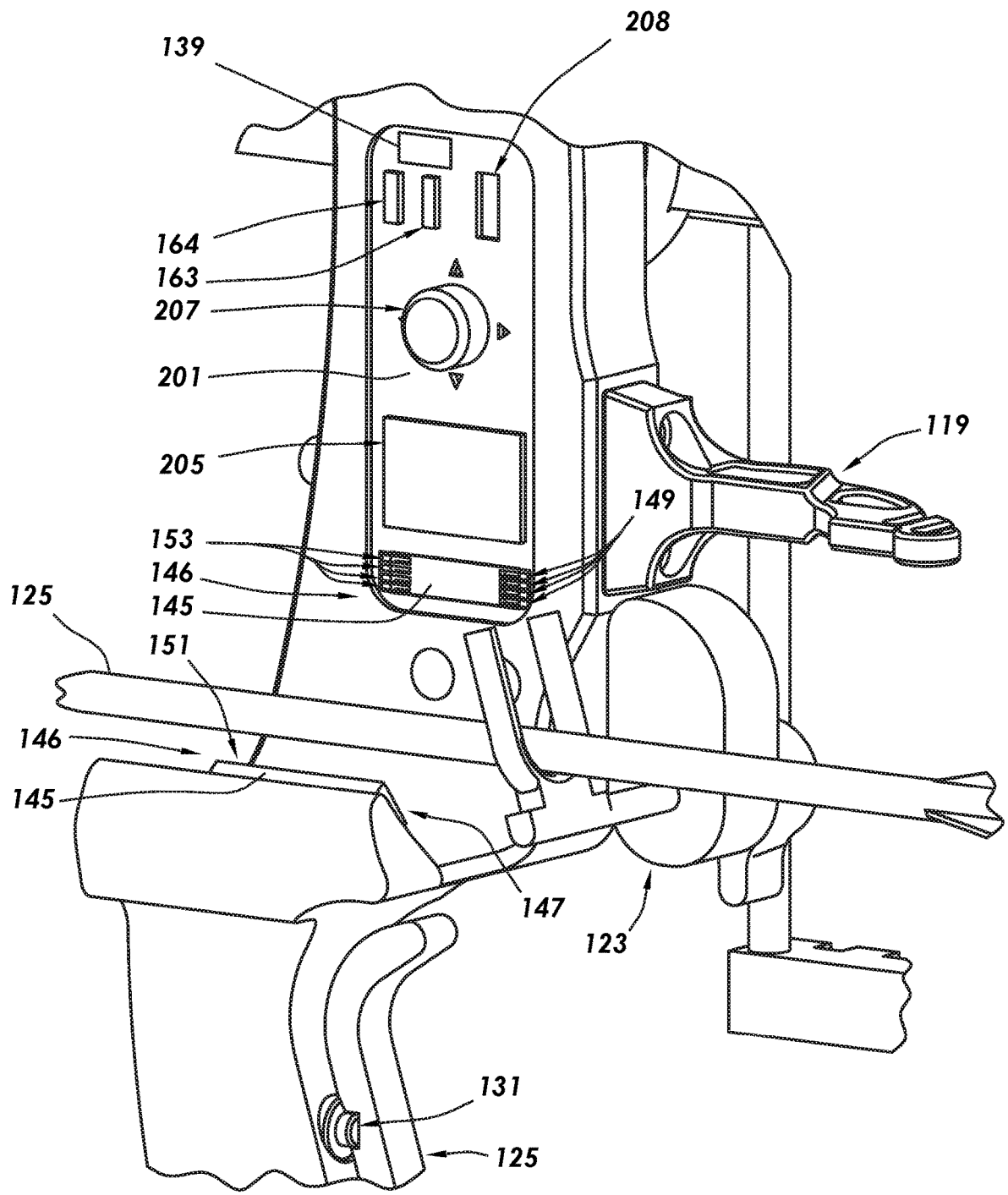
FIG. 2A is a detail perspective view of the riser of FIG. 1.

In some embodiments, sensors 146 of arrow chronometer assembly 145, as depicted in FIGS. 2, 2A, may include two or more optical sensors. FIGS. 2, 2A depict riser 101 with grip 121, arrow rest 123, and other components of compound bow 100 removed for clarity. For example and without limitation, in some embodiments, arrow chronometer assembly 145 may include at least one trailing optical emitter 147, at least one trailing optical receiver 149, at least one leading optical emitter 151, and at least one leading optical receiver 153. Trailing optical emitter 147 and leading optical emitter 151 may each emit an optical signal such as visible light or infrared light.

Trailing optical receiver 149 may be positioned to determine whether a line of sight between trailing optical receiver 149 and trailing optical emitter 147 is blocked by arrow 125. Likewise, leading optical receiver 153 may be positioned to determine whether a line of sight between leading optical receiver 153 and leading optical emitter 151 is blocked by arrow 125. Trailing optical receiver 149 and leading optical receiver 153 may each output a signal depending on whether the optical signal from trailing optical emitter 147 and leading optical emitter 151 reaches trailing optical receiver 149 and leading optical receiver 153, respectively.

Figure 3A:
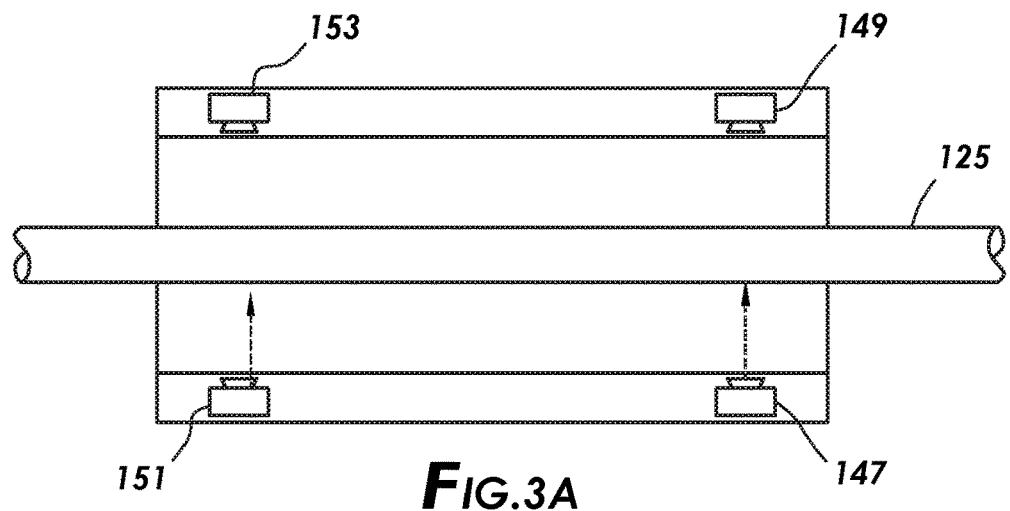
FIG. 3A is a detail view of an arrow chronometer assembly of a performance module consistent with at least one embodiment of the present disclosure with an arrow in a drawn-back position.
Figure 3B:
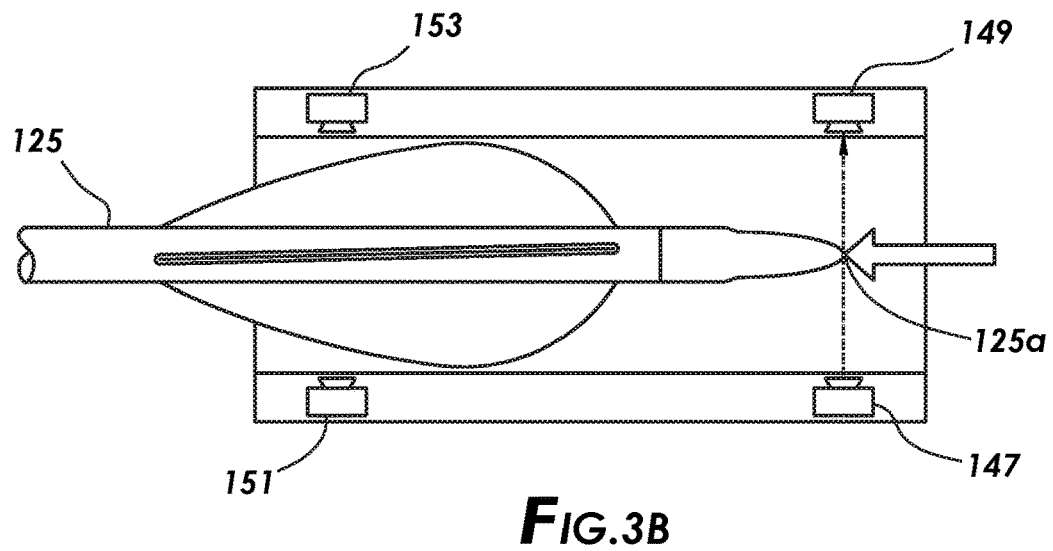
FIG. 3B is a detail view of the arrow chronometer assembly of FIG. 3A with the arrow at an intermediate position.
Figure 3C:
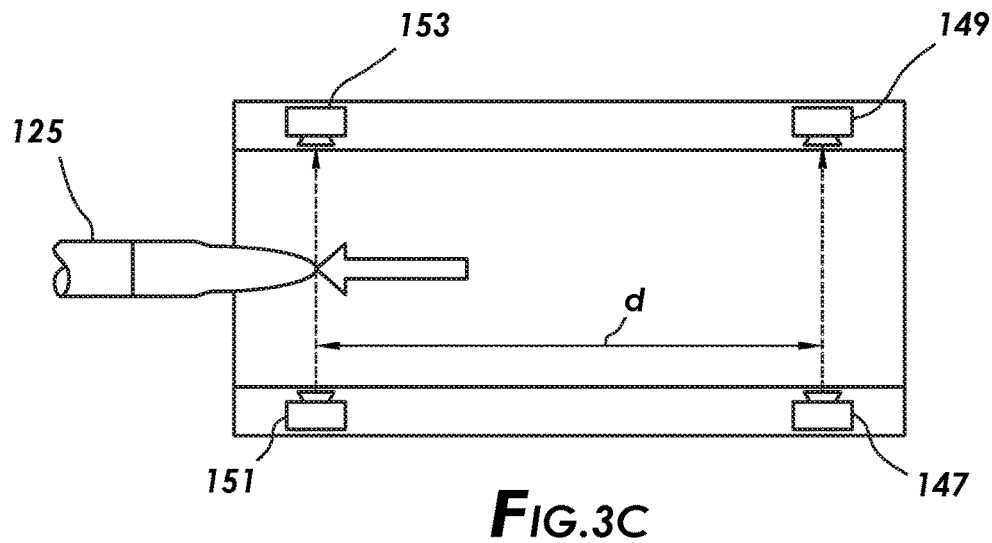
FIG. 3C is a detail view of the arrow chronometer assembly of FIG. 3A with the arrow at the exit position.

In some embodiments, while arrow 125 is positioned on arrow rest 123 during, for example and without limitation, preparation for shooting including during the draw stroke, both the line of sight between trailing optical receiver 149 and trailing optical emitter 147 and the line of sight between leading optical receiver 153 and leading optical emitter 151 are blocked by arrow 125 as shown in FIG. 3A. When bowstring 107 is released during a shooting action, arrow 125 is propelled forward by bowstring 107, passing through arrow chronometer assembly 145. Arrow 125 may progress to a position at which trailing end 125a of arrow 125 passes through the line of sight between trailing optical receiver 149 and trailing optical emitter 147 as shown in FIG. 3B, allowing trailing optical receiver 149 to detect the optical signal from trailing optical emitter 147 at a first time ($t_1$). Arrow 125 may continue to move forward until trailing end 125a of arrow 125 passes through the line of sight between leading optical receiver 153 and leading optical emitter 151, as shown in FIG. 3C, allowing leading optical receiver 153 to detect the optical signal from leading optical emitter 151 at a second time ($t_2$). By measuring the time taken for trailing end 125a of arrow 125 to move from the intermediate position depicted in FIG. 3B at which the line of sight between trailing optical receiver 149 and trailing optical emitter 147 is opened and the exit position depicted in FIG. 3C at which the line of sight between leading optical receiver 153 and leading optical emitter 151 is opened, the arrow speed may be determined using the following formula:

$$\text{Arrow Speed} = \frac{d}{t_2 - t_1}$$

where d is a known distance between trailing optical receiver 149 and leading optical receiver 153 as shown in FIG. 3C.

In some embodiments, with respect to FIG. 1, compound bow 100 may include additional components including flashlight 155 positioned to provide illumination in front of compound bow 100, sight light 157 positioned to provide light onto bow sight 113, camera 159 positioned to capture a photo or video in front of compound bow 100, rangefinder 161 positioned to determine the distance between compound bow 100 and an object or target, as well as other accessories.

Figure 4:
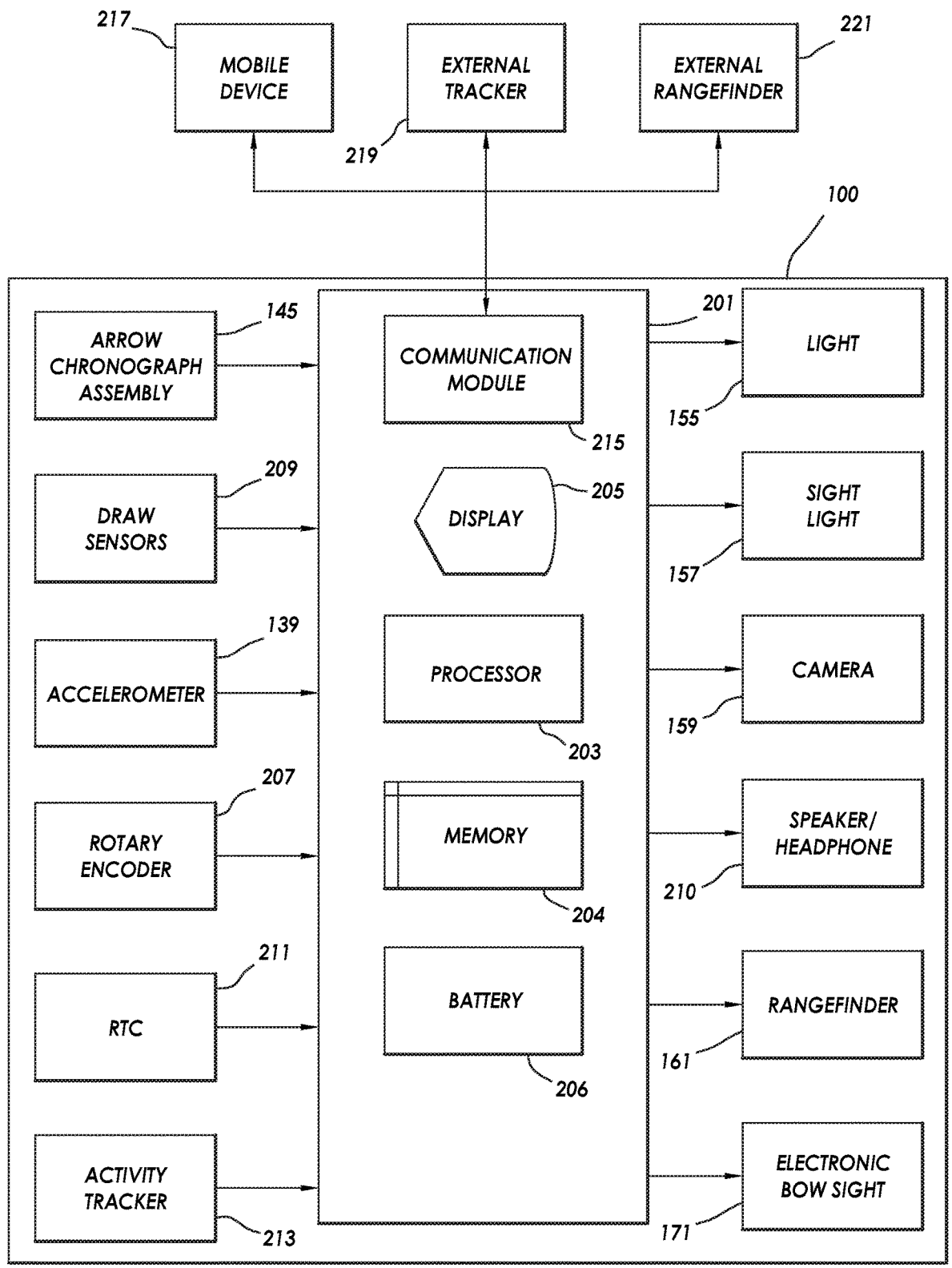
FIG. 4 is a schematic view of a compound bow having a performance module consistent with at least one embodiment of the present disclosure.

FIG. 2 depicts a perspective view of riser 101 separated from other components of compound bow 100. In some embodiments, riser 101 may include performance module 201. In some embodiments, performance module 201 and associated components as discussed further herein below may be integrated into riser 101. In some embodiments, performance module 201, as shown in FIG. 4, may include processor 203 and processor-readable or computer-readable programming code embodying logic embedded on tangible, non-transitory computer readable media, including instructions for controlling functions of performance module 201. In some embodiments, performance module 201 may include memory storage medium 204.

In some embodiments, performance module 201 may include display 205. Display 205 may be used to visually provide information to a user relating to the use of compound bow 100 as further described below. Display 205 may, in some embodiments, include an LED or LCD screen. In some embodiments, display 205 may be a touch screen to allow a user to interact with performance module 201. In some embodiments, display 205 may be positioned as depicted in FIG. 2 on a side of riser 101 substantially aligned with a user's line of sight while using compound bow 100. However, display 205 may be positioned at any point on compound bow 100 without deviating from the scope of this disclosure. In some embodiments, performance module 201 may include additional user feedback interfaces including, for example and without limitation, audio outputs such as speakers or headphones 210. In some embodiments, performance module 201 may use an external device such as a mobile device for such interaction.

In some embodiments, performance module 201 may include a power storage device, depicted in FIG. 4 as battery 206. In some embodiments, battery 206 may be rechargeable while connected to performance module 201. In some embodiments, battery 206 may be removable from performance module 201 and may be user-replaceable. In some embodiments, battery 206 may be used to provide power to other accessory units of compound bow 100. Battery 206 may be a primary cell or a secondary cell. In some embodiments, battery 206 may be a lithium ion battery. In some embodiments, performance module 201 may include charging port 208, shown in FIG. 2A, to allow battery 206 to be charged. In some embodiments, charging port 208 may be used for wired data connectivity to an external device.

In some embodiments, performance module 201 may include one or more user interface devices such as rotary encoder 207, potentiometer 163, and button 164. Rotary encoder 207 may be used, for example and without limitation, to interact with performance module 201. For example, in some embodiments rotary encoder 207 may be used to change between operating modes of performance module 201, to enter data into performance module 201, to change parameters of performance module 201, to enable or disable features of performance module 201, or a combination thereof. In some embodiments, performance module 201 may include additional user interface devices including buttons, switches, potentiometers, or other devices known in the art.

In some embodiments, performance module 201 may receive information from one or more sensors of compound bow 100. FIG. 4 depicts a schematic view of compound bow 100 consistent with at least one embodiment of the present disclosure. In some such embodiments, performance module 201 may receive signals from one or more sensors including, for example and without limitation, draw sensors 209. Draw sensors 209 may include one or more of limb strain gauges 127, limb-riser gap distance sensor 129, grip strain gauges 131, riser strain gauges 133, pressure or force sensor 135, or rotary sensor 141 as discussed above. In some embodiments, performance module 201 may use parameters gathered by draw sensors 209 to determine one or more of if bowstring 107 is being drawn, the draw weight exerted on bowstring 107, and when a shot has been taken. In some embodiments, performance module 201 may store a draw length manually input by a user.

In some embodiments, performance module 201 may use the parameters gathered by draw sensors 209 to determine an arrow speed. In some embodiments, performance module 201 may use the parameters gathered by draw sensors 209 to determine a draw length.

In some embodiments, performance module 201 may receive signals from arrow chronometer assembly 145, allowing performance module 201 to receive or determine the speed at which arrow 125 leaves compound bow 100 during a shot.

In some embodiments, performance module 201 may receive signals from sensor package 139. Performance module 201 may use measurements from sensor package 139 to, for example and without limitation, track movement of compound bow 100 during a shot. Such movement may affect shot placement and accuracy. In some instances, such movement may be a result of improper technique on the part of a user while shooting compound bow 100. By allowing a user to review measurements from sensor package 139 taken while shooting, a user may be able to identify improper techniques and improve shooting form. In some embodiments, performance module 201 may analyze the measurements from sensor package 139 to identify measurements that correspond with known signs of improper technique including, for example and without limitation, torquing the bow, dropping the bow arm, flinching, or plucking bowstring 107. In some embodiments, performance module 201 may analyze the measurements from sensor package 139 and other sensors against a predetermined metric, such that performance module 201 provides a user with an assessment of each shot. In some embodiments, performance module 201 may output the assessment as a score.

In some embodiments, performance module 201 may receive information from additional modules including, for example and without limitation, a time-keeping module such as real-time clock 211. In some embodiments, performance module 201 may receive information from sensors of activity tracker 213, which may include one or more of a pedometer, altimeter, heart rate monitor, and GPS module. In some embodiments, performance module 201 may display this information using display 205.

In some embodiments, performance module 201 may store and analyze the parameters sensed or measured by draw sensors 209, arrow chronometer assembly 145, and sensor package 139. For example and without limitation, in some embodiments, performance module 201 may use the parameters gathered from draw sensors 209, arrow chronometer assembly 145, and sensor package 139 to provide information to a user relating to the operation of compound bow 100. For example, in some embodiments, performance module 201 may allow a user to review the number of shots taken by compound bow as well as the information relating to draw length, draw weight, arrow speed, and movement of compound bow 100 during a shot using display 205. In some embodiments, the information provided by performance module 201 may be used to review a shooter's performance during a previous shot or shooting session.

In some embodiments, performance module 201 may store information relating to each shot taken by compound bow 100. For example and without limitation, in some embodiments, performance module 201 may store one or more of the draw weight, arrow speed, draw length, date and time of shot, measured bow movement, altitude, user heart rate, and location from the GPS module for each shot taken by compound bow 100.

In some embodiments, performance module 201 may allow a user to review such information using display 205.

In some embodiments, performance module 201 may include communications module 215. Communications module 215 may allow for wired or wireless communication between performance module 201 and one or more external devices such as mobile device 217 as shown in FIG. 4. Mobile device 217 may include, for example and without limitation, a tablet, mobile phone, smart watch, computer, external storage device, or any other device. In some embodiments, performance module 201 may transmit information stored therein to mobile device 217 using communications module 215 to, for example and without limitation, allow a user to review and analyze the information using mobile device 217.

In some embodiments, communications module 215 may be used to allow a user to interact with performance module 201 using mobile device 217. For example and without limitation, in some embodiments, mobile device 217 may be used as an additional display for performance module 201 or may allow a user additional methods of user interaction with performance module 201. In some embodiments, a user may use mobile device 217 to input information to performance module 201, to control or change the operating mode of performance module 201, to control one or more auxiliary devices controlled by performance module 201, or to otherwise interact with performance module 201 as further described below.

In some embodiments, communications module 215 may allow performance module 201 to communicate with other external devices including, for example and without limitation, external activity tracker 219 and external rangefinders 221.

In some embodiments, performance module 201 may use parameters sensed or measured by draw sensors 209, arrow chronometer assembly 145, and sensor package 139 to provide suggestions to a user relating to aspects of using compound bow 100. For example, in some embodiments, performance module 201 may use the calculated draw weight and calculated or user-provided draw length to suggest an arrow spline tailored for the specific configuration of compound bow 100.

In some embodiments, performance module 201 may be used to track operation of compound bow 100 in order to provide suggestions or reminders regarding preventative maintenance or to alert a user that a failure may be imminent.

For example and without limitation, in some embodiments, performance module 201 may track the number of shots taken by compound bow 100. In some embodiments, performance module 201 may have one or more predetermined or user-defined shot thresholds used to determine whether preventative maintenance on compound bow 100 should be undertaken. In some such embodiments, performance module 201 may indicate to a user that preventative maintenance is recommended once the number of shots taken by compound bow 100 reaches or exceeds one or more corresponding shot thresholds. For example and without limitation, performance module 201 may include a bowstring waxing shot threshold, such that performance module 201 suggests to a user that waxing bowstring 107 is recommended once the number of shots taken by compound bow 100 meets or exceeds the bowstring waxing shot threshold. As another nonlimiting example, performance module 201 may include a bowstring replacement shot threshold, such that performance module 201 suggests to a user that replacing bowstring 107 is recommended once the number of shots taken by compound bow 100 meets or exceeds the bowstring replacement shot threshold. Performance module 201 may, in some embodiments, make such suggestions using display 205.

In some embodiments, performance module 201 may use the information from draw sensors 209 and arrow chronometer assembly 145, i.e. the draw weight of compound bow 100 and the speed at which arrow 125 leaves compound bow 100, to determine if bowstring 107 is approaching failure. In some cases, before bowstring 107 fails, the performance of bowstring 107 may degrade due to wear of bowstring 107 including, for example and without limitation, fraying or stretching. By monitoring the draw weight and arrow speed for each shot, performance module 201 may identify that the performance of bowstring 107 has degraded, indicating that bowstring 107 may be approaching failure. In some embodiments, performance module 201 may alert a user to the potential failure of bowstring 107 once such a condition has been detected. In some embodiments, performance module 201 may make such an alert using display 205. For example, in some embodiments, once draw weight reduces beyond a predetermined threshold relative to average draw weight stored by performance module 201, performance module 201 may alert the user. In some embodiments, the threshold may be between 5% and 30% below the average draw weight measured by performance module 201.

In some embodiments, performance module 201 may be used to control one or more accessories of compound bow 100. For example and without limitation, FIG. 4 depicts a schematic view of compound bow 100. Performance module 201 may be operatively coupled to one or more other components of compound bow 100 including, for example and without limitation, flashlight 155, sight light 157, camera 159, and rangefinder 161. In some embodiments, performance module 201 may, for example and without limitation, control the operation of these devices, such as, for example and without limitation, turning on or off flashlight 155 and sight light 157 depending on conditions, a user selection, or a selected mode of operation of performance module 201 as further described below.

For example, in some embodiments in which compound bow 100 includes camera 159, performance module 201 may operatively connect to camera 159 and may control the operation of camera 159. In some embodiments, for example and without limitation, performance module 201 may trigger camera 159 to take one or more photos or a video each time a shot is taken with compound bow 100. In some such embodiments, a user may configure the number of photos, amount of time between photos, or amount of time for the video to continue after the shot. Such imagery may, for example and without limitation, allow a user to review shot placement for learning purposes after a shooting session, or may allow the user to save or share pictorial or video corroboration of the results of a shot without the need to manually take a picture or video during the shot.

As another nonlimiting example, in some embodiments, compound bow 100 may automatically control operation of flashlight 155 and sight light 157 depending on, for example and without limitation, time of day or ambient lighting conditions. In some embodiments, flashlight 155 and/or sight light 157 may be automatically activated after dark or in response to an action of a user such as, for example and without limitation, at the beginning of a draw stroke.

In some embodiments, a user may select which functions of performance module 201 to use. In some embodiments, such a selection may be made by allowing a user to select between different operating modes of performance module 201, in which one or all functions of performance module 201 are selectively enabled. Additionally, in some embodiments, the activity and content of display 205 may be changed to reflect the selected operating mode. For example and without limitation, in some embodiments, performance module 201 may be operated in one or more of a tuning mode, shot tuning mode, coaching mode, target mode, hunting mode, low light mode, minimalist mode, and game mode. These modes and the following discussion thereof are merely examples of possible modes and are not intended to limit the scope of the present disclosure to only the modes mentioned herein.

For example, in some embodiments, while performance module 201 is in tuning mode, functions of performance module 201 that relate to physical parameters of compound bow 100 during operation may be enabled and display 205 may be used to predominantly display information useful to a user while tuning compound bow 100. For example, functions associated with measurement of draw weight, vibration, arrow speed, and balance of compound bow 100 may be enabled and displayed on display 205. In some embodiments, while in tuning mode, information relating to adjustment of components of compound bow 100 such as positioning of components of arrow chronometer assembly 145 to properly measure the arrow speed may be available. In some embodiments, tuning mode may allow a user to compare performance of compound bow 100 when compound bow 100 is adjusted or configured in different ways or used with different equipment to allow the user to determine what adjustments or configuration best suits the user. In some embodiments, performance module 201 may provide a user with suggestions as to adjustments to be made to compound bow 100 based on the measurements of performance module 201.

In some embodiments, while performance module 201 is in shot tuning mode, functions of performance module 201 that relate to the shooting of compound bow 100 may be enabled and display 205 may be configured to predominantly display information useful to a user while shooting compound bow 100. For example, display 205 may display information relating to movement of compound bow 100 during a shot, draw weight, and arrow speed.

In some embodiments, while performance module 201 is in coaching mode, performance module 201 may operate with one or more functions to assist a user in improving shooting form. In such an embodiment, functions of performance module 201 that relate to measurements of compound bow 100 during a shot may be enabled. Performance module 201 may be configured to display information helpful to a user in improving their shooting form. In some embodiments, performance module 201 may include one or more training functions. For example and without limitation, performance module 201 may provide a user with a signal for releasing bowstring 107 after a time delay after performance module 201 determines that bowstring 107 has been fully drawn back. Performance module 201 may record information relating to movement of compound bow 100 during the delay period and during the subsequent shot, providing the information to the user after the shot is taken. Such an exercise may, for example and without limitation, allow a user to improve stamina and steadiness when holding the bow at full draw. In some embodiments, performance module 201 may provide feedback for shooting form based on measurements of arrow speed and movement of compound bow 100 during the shot when in coaching mode.

In some embodiments, while performance module 201 is in target mode, performance module 201 may operate to allow a user to keep track of a score while shooting. In some embodiments, performance module 201 may record information about bow movement and other metrics while in target mode such that a user may, for example and without limitation, review such data as compared to scores to identify improvement in technique over time.

In some embodiments, while performance module 201 is in hunting mode, performance module 201 may operate to best suit a user of compound bow 100 when using compound bow 100 for hunting. In some jurisdictions, the use of certain accessories including, for example and without limitation, flashlight 155, sight light 157, and rangefinder 161, may be restricted or prohibited. When in hunting mode, performance module 201 may allow a user to quickly and reliably disable the prohibited accessories, while allowing such accessories to be easily enabled once the user is no longer hunting.

In some embodiments, while performance module 201 is in low light mode, performance module 201 may operate to best suit a user of compound bow 100 when in low light conditions. In some embodiments, performance module 201 may automatically enter low light mode depending on conditions including the time of day or by detecting lighting conditions automatically. In some embodiments, performance module 201 may dim or turn off display 205 when in low light mode. In some embodiments, performance module 201 may automatically control operation of illumination accessories such as flashlight 155 and sight light 157 or may provide more ready access to control of such devices to a user when in low light mode.

In some embodiments, while performance module 201 is in minimalist mode, display 205 and other feedback of performance module 201 may be disabled, allowing the user to use compound bow 100 as if it were a normal bow without performance module 201. In some embodiments, any accessories controlled by performance module 201 may be automatically disabled when in minimalist mode. In some embodiments, performance module 201 may continue to record information relating to the use of compound bow 100 while in minimalist mode.

In some embodiments, while performance module 201 is in game mode, performance module 201 may enable one or more functions to allow a user to compete with a user of another compound bow having a performance module. In some embodiments, performance module 201 may, for example and without limitation, provide a score or other assessment of each of a user's shot to allow comparison with another user's shot on their compound bow. In some embodiments, the performance module 201 of each compound bow 100 may be in communication such that scores are automatically compared to assess the winner of the competition. In some embodiments, performance module 201 may be used to score each shot, and automatically compare the scores between the users during the competition. In some embodiments, game mode may be used between compound bows 100 in real time or in the same location. In some embodiments, game mode may allow a user to compete against a user using compound bow 100 at another time or in another location. In some embodiments, game mode may allow a user to compete against a previous game mode shooting session.

In some embodiments, as shown in FIG. 4, compound bow 100 may include electronic bow sight 171. Electronic bow sight 171 may, in some embodiments, use information input into and determined by performance module 201 to adapt the sight picture provided to a user to adjust the point of impact of an arrow released from compound bow 100 based on such information. For example and without limitation, electronic bow sight 171 may adjust the indicated point of impact based on parameters such as, for example and without limitation, shot velocity and arrow weight as discussed herein above.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A compound bow comprising:
   a riser;
   an upper limb, the upper limb coupled to the riser;
   a lower limb, the lower limb coupled to the riser;
   a draw sensor, the draw sensor including a grip strain gauge positioned between a grip and the riser;
   a performance module integrally housed in the riser, the performance module operatively coupled to the draw sensor, the performance module including:
   a display;
   a sensor package including one or more of an accelerometer or gyroscope;
   a rotary encoder;
   a GPS module; and
   a power storage device;
   an arrow chronometer assembly, the arrow chronometer assembly integrally housed in the riser at or near an arrow rest of the riser, the arrow chronometer assembly including one or more sensors positioned to detect movement of an arrow through the arrow chronometer assembly.

2. The compound bow of claim 1, further comprising a limb strain gauge coupled to the upper or lower limb, a limb-riser gap distance sensor positioned between the upper limb or lower limb and the riser, a riser strain gauge coupled to the riser, a pressure or force sensor positioned between a limb adjustment bolt and the riser, or a rotary sensor coupled to an upper wheel coupled to the upper limb or to a lower wheel coupled to the lower limb.

3. The compound bow of claim 1, wherein the sensors of the arrow chronometer assembly comprise one or more electromagnetic sensors and wherein the arrow includes one or more magnetic markers.

4. The compound bow of claim 1, wherein the sensors of the arrow chronometer assembly comprise one or more ultrasonic sensors positioned to detect movement of the arrow through the arrow chronometer assembly.

5. The compound bow of claim 1, wherein the sensors of the arrow chronometer assembly comprise:
   a trailing optical emitter, the trailing optical emitter emitting a first optical signal;
   a trailing optical receiver, the trailing optical receiver positioned to receive the first optical signal when the arrow is not aligned with a first line of sight between the trailing optical emitter and trailing optical receiver;

a leading optical emitter, the leading optical emitter emitting a second optical signal; and a leading optical receiver, the leading optical receiver positioned to receive the second optical signal when the arrow is not aligned with a second line of sight between the leading optical emitter and leading optical receiver.

6. The compound bow of claim 1, further comprising a real-time clock.

7. The compound bow of claim 1, wherein the performance module further comprises an activity tracker, the activity tracker including one or more of a pedometer, altimeter, heart rate monitor, or GPS module, the tracked activity displayable on the display.

8. A method comprising:
providing a compound bow, the compound bow including:
  a riser;
  an upper limb, the upper limb coupled to the riser;
  a lower limb, the lower limb coupled to the riser;
  a bowstring coupled between the upper limb and the lower limb;
  a draw sensor, the draw sensor including a grip strain gauge positioned between a grip and the riser; and
  a performance module integrally housed in the riser, the performance module operatively coupled to the draw sensor, the performance module including:
    a display;
    a sensor package including one or more of an accelerometer or gyroscope;
    a rotary encoder;
    a GPS module, and
    a power storage device;
placing an arrow onto the compound bow;
drawing back the bowstring;
measuring, with the draw sensor, at least one parameter indicative of a draw weight or draw length;
determining the draw weight or draw length with the performance module; and
displaying the draw weight or draw length on the display.

9. The method of claim 8, wherein the compound bow further comprises a limb strain gauge coupled to the upper or lower limb, a limb-riser gap distance sensor positioned between the upper limb or lower limb and the riser, a riser strain gauge coupled to the riser, a pressure or force sensor positioned between a limb adjustment bolt and the riser, or a rotary sensor coupled to an upper wheel coupled to the upper limb or to a lower wheel coupled to the lower limb.

10. The method of claim 8, further comprising:
releasing the bowstring to shoot the arrow; and
determining the arrow speed with the performance module.

11. The method of claim 10, further comprising:
measuring, with the draw sensor, at least one parameter indicative of arrow speed; and
wherein determining the arrow speed with the performance module comprises using the at least one parameter indicative of arrow speed.

12. The method of claim 10, wherein the compound bow further comprises:
an arrow chronometer assembly, the arrow chronometer assembly mechanically coupled to the riser at or near the arrow rest, the arrow chronometer assembly including one or more sensors positioned to detect movement of the arrow through the arrow chronometer assembly;
sensing the movement of the arrow through the arrow chronometer assembly with the one or more sensors; and measuring the arrow speed based on the sensed movement of the arrow through the arrow chronometer assembly.

13. The method of claim 12, wherein:
the sensors of the arrow chronometer assembly comprise one or more electromagnetic sensors;
the arrow includes one or more magnetic markers; and
wherein measuring the arrow speed comprises detecting the one or more magnetic markers with the one or more electromagnetic sensors.

14. The method of claim 12, wherein:
the sensors of the arrow chronometer assembly comprise one or more ultrasonic sensors; and
wherein measuring the arrow speed comprises detecting the movement of the arrow through the arrow chronometer assembly with the one or more ultrasonic sensors.

15. The method of claim 12, wherein:
the sensors of the arrow chronometer assembly comprise:
  a trailing optical emitter, the trailing optical emitter emitting a first optical signal;
  a trailing optical receiver, the trailing optical receiver positioned to receive the first optical signal when the arrow is not aligned with a first line of sight between the trailing optical emitter and trailing optical receiver;
  a leading optical emitter, the leading optical emitter emitting a second optical signal; and
  a leading optical receiver, the leading optical receiver positioned to receive the second optical signal when the arrow is not aligned with a second line of sight between the leading optical emitter and leading optical receiver; and
wherein measuring the arrow speed comprises:
  detecting that the arrow is not aligned with the first line of sight at a first time;
  detecting that the arrow is not aligned with the second line of sight at a second time; and
  determining the speed of the arrow based on the difference between the first time and the second time and a known distance between the trailing optical receiver and the leading optical receiver.

16. The method of claim 10, wherein the method further comprises measuring one or more of vibration, balance, or movement of the compound bow during at least one of the drawing or releasing operations or during a time period after the releasing operation.

17. The method of claim 10, further comprising:
repeating the placing, drawing, and releasing operations to shoot subsequent arrows;
counting, with the performance module, the number of shots taken by the compound bow; and
displaying the number of shots taken by the compound bow on the display.

18. The method of claim 17, further comprising determining whether the number of shots taken by the compound bow exceeds one or more user-defined shot thresholds; and, if the number of shots taken exceeds one or more of the one or more user-defined shot thresholds, indicating to a user that preventative maintenance is recommended with the display.

19. The method of claim 10, further comprising:
repeating the placing, drawing, and releasing operations to shoot subsequent arrows;
storing the measured draw weight on each shot;
comparing the measured draw weight on each shot with an average draw weight determined from the measured draw weights on previous shots;

comparing the measured draw weight with the average draw weight;
determining that the bowstring is approaching failure based on the measured draw weight on each shot; and
indicating to a user that preventative maintenance is recommended with the display.

20. The method of claim 10, wherein the performance module further comprises a GPS module, wherein the method further comprises:
determining the location at which the shot was taken; and
storing the location of the shot.

21. The method of claim 20, further comprising displaying the location of the shot on the display.

22. The method of claim 8, wherein the compound bow further comprises one or more of a flashlight, sight light, camera, or rangefinder integrated into the riser, and wherein the method further comprises controlling the operation of the one or more of a flashlight, sight light, camera, or rangefinder using the performance module.

23. The method of claim 8, wherein the performance module further comprises an activity tracker, the activity tracker including one or more of a pedometer, altimeter, heart rate monitor, or GPS module, wherein the method further comprises displaying the tracked activity on the display.

* * * * *